(12) United States Patent
Lester et al.

(10) Patent No.: US 12,072,844 B2
(45) Date of Patent: Aug. 27, 2024

(54) DATA REDUCTION IN A STORAGE SYSTEM

(71) Applicant: HEWLETT PACKARD ENTERPRISE DEVELOPMENT LP, Houston, TX (US)

(72) Inventors: Robert Michael Lester, Colorado Springs, CO (US); Susan Agten, Boise, ID (US); Matthew S. Gates, Houston, TX (US); Alex Veprinsky, San Jose, CA (US)

(73) Assignee: Hewlett Packard Enterprise Development LP, Spring, TX (US)

( * ) Notice: Subject to any disclaimer, the term of this patent is extended or adjusted under 35 U.S.C. 154(b) by 0 days.

(21) Appl. No.: 17/816,056

(22) Filed: Jul. 29, 2022

(65) Prior Publication Data

US 2024/0037072 A1    Feb. 1, 2024

(51) Int. Cl.
*G06F 16/00*    (2019.01)
*G06F 3/06*    (2006.01)
*G06F 16/174*    (2019.01)

(52) U.S. Cl.
CPC ........ *G06F 16/1744* (2019.01); *G06F 3/0608* (2013.01); *G06F 3/0641* (2013.01); *G06F 3/0658* (2013.01); *G06F 3/0673* (2013.01)

(58) Field of Classification Search
None
See application file for complete search history.

(56) References Cited

U.S. PATENT DOCUMENTS

| 10,664,165 | B1 | 5/2020 | Faibish et al. |
| 2012/0150954 | A1 | 6/2012 | Tofano |
| 2014/0244604 | A1 | 8/2014 | Oltean et al. |
| 2020/0134049 | A1 | 4/2020 | Bassov et al. |
| 2020/0341667 | A1* | 10/2020 | Bassov ................. G06F 3/0641 |

OTHER PUBLICATIONS

"Data Compression Corpora", available online at <http://www.data-compression.info/Corpora/index.html>, 2022, 2 pages.
DELL, "DELL EMC Unity: Compression", Mar. 2018, 39 Pages.
Github, "Zstandard Real Time Data compression Algorithm", available online at <https://web.archive.org/web/20210324105212/https://facebook.github.io/zstd/>, Mar. 24, 2021, 11 pages.

(Continued)

*Primary Examiner* — Anhtai V Tran
(74) *Attorney, Agent, or Firm* — Trop, Pruner & Hu, P.C.

(57) ABSTRACT

Example implementations relate to storing data in a storage system. An example includes receiving, by a storage controller of a storage system, a data unit to be stored in persistent storage of the storage system. The storage controller determines maximum and minimum entropy values for the received data unit. The storage controller determines, based on at least the minimum entropy value and the maximum entropy value, whether the received data unit is viable for data reduction. In response to a determination that the received data unit is viable for data reduction, The storage controller performs at least one reduction operation on the received data unit.

20 Claims, 8 Drawing Sheets

(56) References Cited

OTHER PUBLICATIONS

John, "Rényi Entropy", available online at <https://www.johndcook.com/blog/2018/11/21/renyi-entropy/>, Nov. 21, 2018, 6 pages.
Kranz et al., "data deduplication", available online at <https://web.archive.org/web/20220118103251/https://www.techtarget.com/searchstorage/definition/data-deduplication>, Jan. 18, 2022, 11 pages.
Wikipedia, "LZ4 (compression algorithm)", available online at <https://en.wikipedia.org/w/index.php?title=LZ4_(compression_algorithm)&oldid=1070288448>, Feb. 6, 2022, 3 pages.
Balakrishnan et al., "Relationship Between Entropy and Test Data Compression," Feb. 2007, IEEE Transactions on Computer-Aided Design of Integrated Circuits and Systems, vol. 26, No. 2, pp. 386-395.
Ebeling et al., "Entropy and Compressibility of Symbol Sequences," Feb. 23, 1997, PhysComp96, 5pgs.
Hewlett-Packard Development Company, L.P., "HP StoreOnce Backup systems, G3 BBxxxA models Best practices for VTL, NAS, StoreOnce Catalyst and Replication implementations," Mar. 2013, <https://community.microfocus.com/cfs-file/_key/telligent-evolution-components-attachments/00-208-01-00-01-37-19-32/Best-Practices-for-VTL_2C00_-NAS_2C00_-StoreOnce-Catalyst.pdf>, 164 pages.
M4rt1n et al., "Compression makes some files bigger," Nov. 2019, Cloudflare Community, <https://community.cloudflare.com/t/compression-makes-some-files-bigger/129229>, 16 pages.

\* cited by examiner

| Index | Constant |
|---|---|
| 0 | 0.000000 |
| 1 | 0.000000 |
| 2 | 1.000000 |
| 3 | 1.584963 |
| ⋮ | ⋮ |
| 256 | 8.000000 |

FIG. 2A — LUT 135

| Threshold | Value |
|---|---|
| Second Upper (UT2) | 7.5 |
| First Upper (UT1) | 6.0 |
| Third (T3) | 5.5 |
| Second Lower (LT2) | 5.0 |
| First Lower (LT1) | 4.0 |

FIG. 2B — Thresholds 137

DATA REDUCTION IN A STORAGE SYSTEM

BACKGROUND

Data reduction techniques can be applied to reduce the amount of data stored in a storage system. Some example data reduction techniques include data compression and data deduplication. Data deduplication identifies data units that are duplicative, and seeks to reduce or eliminate the number of instances of duplicative data units that are stored in the storage system.

BRIEF DESCRIPTION OF THE DRAWINGS

Some implementations are described with respect to the following figures.

FIGS. 2A-2B are illustrations of example data structures, in accordance with some implementations.

Figure 1A:
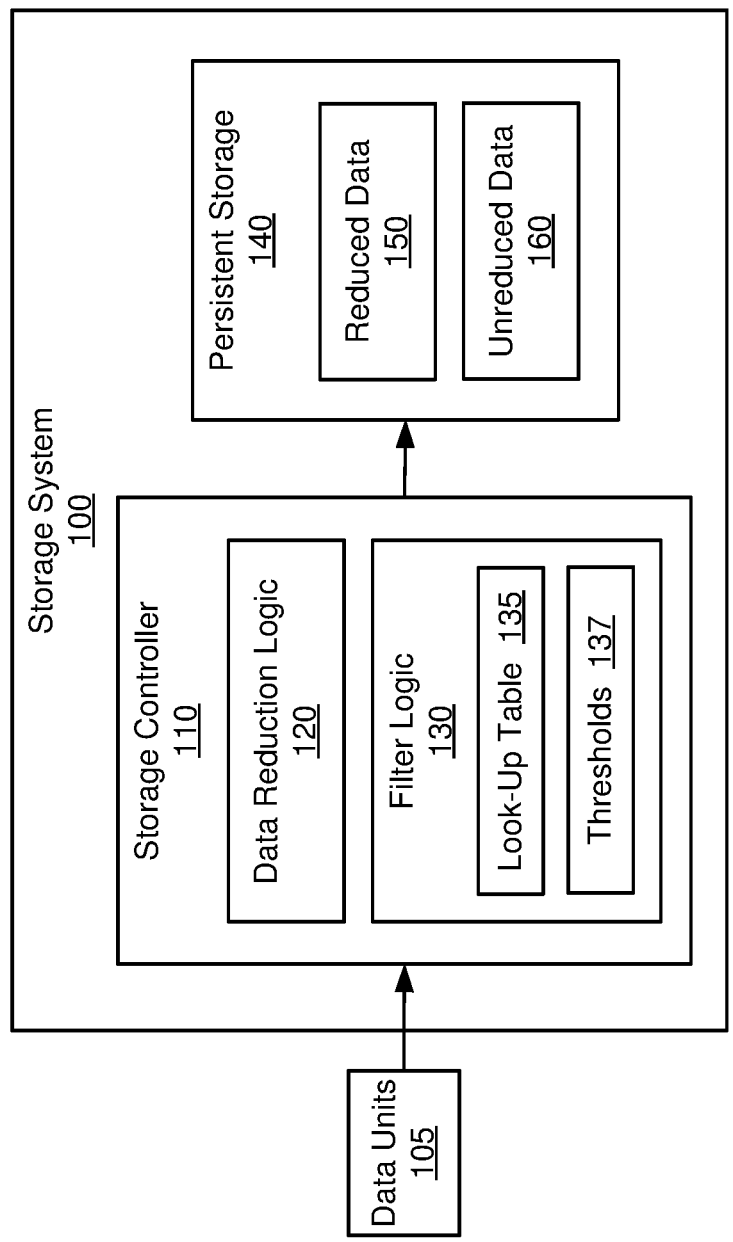
FIGS. 1A-1B are schematic diagrams of an example storage system, in accordance with some implementations.

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION

In the present disclosure, use of the term "a," "an," or "the" is intended to include the plural forms as well, unless the context clearly indicates otherwise. Also, the term "includes," "including," "comprises," "comprising," "have," or "having" when used in this disclosure specifies the presence of the stated elements, but do not preclude the presence or addition of other elements.

In some examples, a storage system may perform data reduction operations to attempt to reduce the amount of space required to store received data. The data reduction operations may include data compression operations, data deduplication operations, or a combination thereof. For example, a compression operation may include encoding information using fewer bits than used in an original form. Further, a deduplication operation may include dividing an incoming data stream into multiple data units, and determining which incoming data units are duplicates of previously stored data units. For an incoming data unit that is determined to be a duplicate, the storage system may store a reference to the previous data unit instead of storing the duplicate incoming data unit.

In some examples, a deduplication operation may include comparing fingerprints of the incoming data units to fingerprints of the stored data units. As used herein, the term "fingerprint" refers to a value derived by applying a function on the content of the data unit (where the "content" can include the entirety or a subset of the content of the data unit). An example of the function that can be applied includes a hash function that produces a hash value based on the incoming data unit. Examples of hash functions include cryptographic hash functions such as the Secure Hash Algorithm 2 (SHA-2) hash functions, e.g., SHA-224, SHA-256, SHA-384, etc. In other examples, other types of hash functions or other types of fingerprint functions may be employed.

A "storage system" can include a storage device or an array of storage devices. A storage system may also include storage controller(s) that manage(s) access of the storage device(s). A "data unit" can refer to any portion of data that can be separately identified in the storage system. In some cases, a data unit can refer to a chunk, a collection of chunks, or any other portion of data. In some examples, a storage system may store data units in persistent storage. Persistent storage can be implemented using one or more of persistent (e.g., nonvolatile) storage device(s), such as disk-based storage device(s) (e.g., hard disk drive(s) (HDDs)), solid state device(s) (SSDs) such as flash storage device(s), or the like, or a combination thereof.

A "controller" can refer to a hardware processing circuit, which can include any or some combination of a microprocessor, a core of a multi-core microprocessor, a microcontroller, a programmable integrated circuit, a programmable gate array, a digital signal processor, or another hardware processing circuit. Alternatively, a "controller" can refer to a combination of a hardware processing circuit and machine-readable instructions (software and/or firmware) executable on the hardware processing circuit.

In some examples, a deduplication storage system may receive and store various types of data (e.g., from different applications, with different types of content, etc.). However, some types of data may not be viable for reduction. For example, data that is not viable for reduction may include data that does not include repeating patterns, that is substantially random, and so forth. Further, attempting to reduce such data may consume a relatively large amount of processing time and/or energy, but may provide little or no benefit in terms of reducing the storage space required to store the received data. Accordingly, attempting to reduce data that is not viable for reduction may result in relatively slow and/or inefficient performance of the storage system.

In accordance with some implementations of the present disclosure, a storage system may include a storage controller to determine whether to attempt data reduction for particular data units. In some implementations, the storage controller may analyze an incoming data unit to determine one or more entropy values for that data unit, and may determine that the data unit is viable for reduction if the entropy values satisfy corresponding thresholds. If it is determined that the data unit is viable for reduction, the storage controller may attempt a reduction of that data unit. In this manner, the storage controller may avoid attempting to reduce data units that are not viable for data reduction. Accordingly, the storage controller may save processing time and/or energy that would otherwise be wasted in unproductive reduction attempts, and may thereby improve the performance and efficiency of the storage system.

Figure 1B:
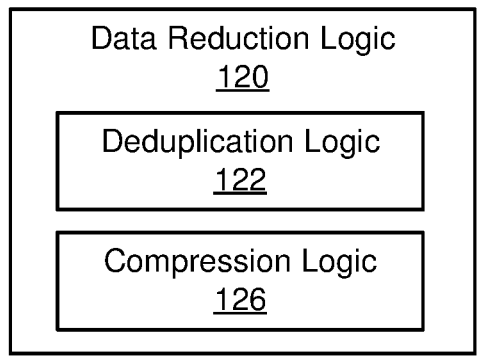

FIGS. 1A-1B—Example Storage System

FIG. 1A shows an example of a storage system 100 that includes a storage controller 110, memory 115, and persistent storage 140, in accordance with some implementations.

As shown, the persistent storage 140 may include reduced data 150 and unreduced data 160. The persistent storage 140 may include one or more non-transitory storage media such as hard disk drives (HDDs), solid state drives (SSDs), optical disks, and so forth, or a combination thereof. The memory 115 may be implemented in semiconductor memory such as random access memory (RAM).

In some implementations, the storage controller 110 may include or execute data reduction logic 120 and filter logic 130. The storage controller 110 and the included logic 120, 130 may be implemented as a processor executing instructions (e.g., software and/or firmware) that are stored in a machine-readable storage medium, in hardware (e.g., circuitry), and so forth.

In some implementations, the data reduction logic 120 may perform reduction operations to attempt to reduce selected data units 105. For example, as shown in FIG. 1B, the data reduction logic 120 may include deduplication logic 122 and compression logic 126. The deduplication logic 122 may perform data deduplication operations including generating a fingerprint for a received data unit 105 (e.g., a full or partial hash value), and comparing the generated fingerprint to stored fingerprints of previously received data units. If this comparison results in a match, then it may be determined that a duplicate of the received data unit 105 is already stored by the storage system 100. Further, in some implementations, the compression logic 126 may perform data compression of data units. For example, the compression logic 126 may perform one or more of run-length encoding, Huffman coding, arithmetic coding, Lempel-Ziv algorithms, and so forth.

In some implementations, the filter logic 130 may determine whether a received data unit 105 is viable for reduction, and if so, may cause the data reduction logic 120 to attempt a reduction of that data unit 105. For example, the filter logic 130 may determine one or more numerical values indicating entropy characteristics (referred to herein as "entropy values") for a data unit 105, and may compare the entropy values against corresponding thresholds 137 to determine whether the data unit 105 is viable for reduction. If the comparison of the entropy values to the corresponding thresholds 137 indicates that a data unit 105 is viable for reduction, the filter logic 130 may cause the data reduction logic 120 to attempt a reduction of the data unit 105. If the reduction is successful, the reduced data unit 105 may be stored in the persistent storage 140 as reduced data 150. However, if the comparison of the entropy values to the thresholds 137 indicates that the data unit 105 is not viable for reduction, no reduction of the data unit 105 is attempted, and the data unit 105 is stored in the persistent storage 140 as unreduced data 160. In this manner, the filter logic 130 may reduce the amount of processing time and/or energy that would be wasted in an attempting to reduce data units 105 that are not viable for reduction, and may thereby improve the performance of the storage system 100.

In some examples, the reduction operations performed by the data reduction logic 120 may fail to reduce the size of a data unit 105 by at least a minimum amount or ratio (e.g., at least a 2:1 space reduction). Such reduction operations may be referred to herein as "failed" reductions. The minimum amount of reduction that is required for the storage system 100 may be as specified as a system configuration setting. In some implementations, upon detecting a failed reduction of a data unit 105, the data reduction logic 120 may store that data unit 105 in unreduced form in the persistent storage 140 (e.g., as unreduced data 160).

In some implementations, the filter logic 130 may use multiple entropy values, including a maximum entropy value, a minimum entropy value, and a Shannon entropy value. As used herein, the term "maximum entropy" may refer to a value that measures the maximum possible degree of uncertainty present in a set of data samples. Further, as used herein, the term "minimum entropy" may refer to a value that measures the minimum possible degree of uncertainty present in a set of data samples.

In some examples, a discrete random variable X may have n possible values, where the ith outcome has probability $p_i$. In such examples, the maximum entropy (also referred to as the Hartley entropy) may be calculated as the binary log of the number of values that X can take on with non-zero probability, which may be represented as $\log_2 n$. Further, in some examples, the minimum entropy (also referred to as the Rényi entropy) may be calculated as the negative binary log of the probability of the most probable outcome, which may be represented as $-\log_2(\max p_i)$. Furthermore, in some examples, the Shannon entropy may be calculated as the negative of the sum of the probability of each outcome multiplied by the binary log of the probability of each outcome, which may be represented as $-\Sigma^n(p_i * \log_2(p_i))$.

In some implementations, the filter logic 130 may use modified calculations to calculate the maximum, minimum, and Shannon entropy values. For example, the modified calculations performed by filter logic 130 may use integer arithmetic to calculate the maximum, minimum, and Shannon entropy values. Examples of the modified calculations performed by filter logic 130 are discussed below with reference to FIGS. 4A-4B. In another example, the modified calculations use a look-up table 135 to calculate the maximum, minimum, and Shannon entropy values. The look-up table 135 may be a stored data structure including an array of constants to determine binary logarithm values. An example implementation of the look-up table 135 is discussed below with reference to FIG. 2A. In some implementations, the modified calculations performed by filter logic 130 may avoid performing floating-point arithmetic, as well as the direct computation of binary logarithms. Accordingly, the use of the modified calculations may reduce the processing load associated with using the filter logic 130.

In some implementations, the filter logic 130 may periodically identify a data unit 105 having an entropy value that is within a given amount away from the corresponding threshold 137 (e.g., does not satisfy the threshold 137, but is within a specified distance from the threshold 137). The filter logic 130 may attempt to reduce this identified data unit 105, and may determine whether the attempted reduction has failed. Upon determining that the attempted reduction did not fail, the filter logic 130 may adjust the threshold 137 so that the entropy value of the data unit 105 satisfies the adjusted threshold 137. In this manner, the filter logic 130 may periodically adjust the thresholds 137 to better correspond to entropy levels associated with data units that are viable for reduction, and may thereby improve the performance of data reduction in the storage system 100.

FIGS. 2A-2B—Example Data Structures

FIG. 2A shows an example look-up table 135, in accordance with some implementations. As shown, the look-up table 135 may include multiple entries, with each entry corresponding to a different combination of an index value I and a constant value C. In some implementations, the filter logic 130 (shown in FIG. 1A) may match an input against the index values I of the look-up table 135, and may thereby determine the constant value C that corresponds to the input value. It is noted that, while FIG. 2A shows the index values I as data fields that are stored in the look-up table 135, other implementations are possible. For example, the look-up table 135 may be implemented as an ordered array of constants, and the index value I for a given constant C may be determined by the particular position of that constant C in the ordered array (e.g., the first position has index I=0, the second position has index I=1, and so forth).

In some implementations, the index values I of the look-up table 135 may correspond to a defined range of integer values (e.g., 0 to 256). Further, for each index value I, the corresponding constant C may be a floating-point number of a given length (e.g., seven digits) that is calculated as the binary logarithm of the index value I (i.e., $\log_2(I)$). Accordingly, in such implementations, the binary logarithm of I may be obtained by performing a look-up of the input I in the look-up table 135. In this manner, use of the look-up table 135 may allow logarithm values to be determined without using floating-point arithmetic, and may thus reduce the amount of processing required by the filter logic 130 to determine entropy values.

FIG. 2B shows an example implementation of a data structure storing the thresholds 137. In some implementations, the thresholds 137 may include, in order of increasing value, a first lower threshold (LT1), a second lower threshold (LT2), a third threshold (T3), a first upper threshold (UT1), and a second upper threshold (UT2). However, other implementations are possible. The thresholds 137 may be compared against corresponding entropy values generated by the filter logic 130 in order to determine whether a given data unit is viable for data reduction. An example process for comparing the thresholds 137 to corresponding entropy values is discussed below with reference to FIG. 3.

Figure 3:
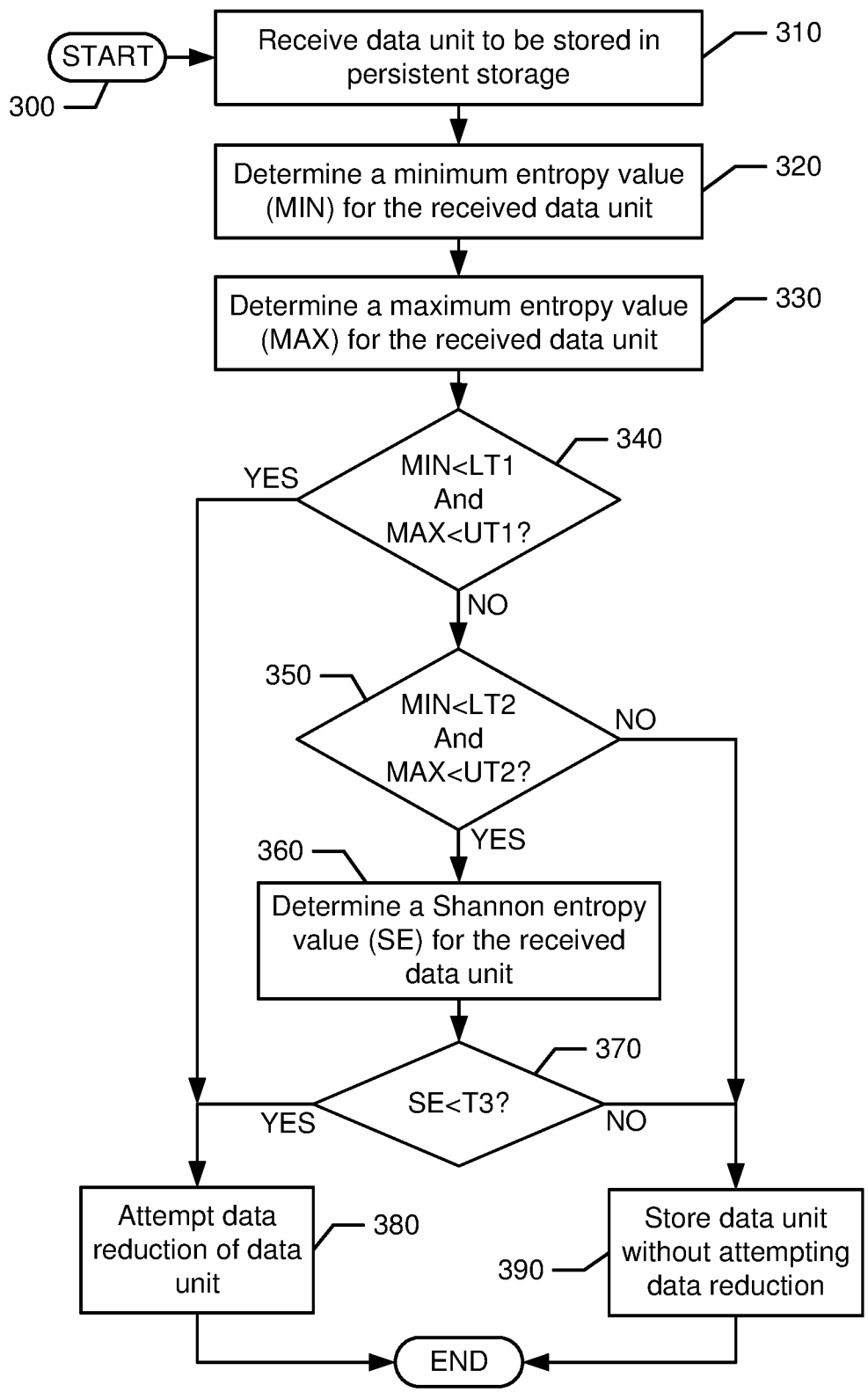
FIG. 3 is an illustration of an example process, in accordance with some implementations.

FIG. 3—Example Process for Storing Data

FIG. 3 shows an example process 300 for storing data, in accordance with some implementations. In some examples, the process 300 may be performed using the storage controller 110 (shown in FIG. 1A). The process 300 may be implemented in hardware or a combination of hardware and programming (e.g., machine-readable instructions executable by a processor(s)). The machine-readable instructions may be stored in a non-transitory computer readable medium, such as an optical, semiconductor, or magnetic storage device. The machine-readable instructions may be executed by a single processor, multiple processors, a single processing engine, multiple processing engines, and so forth. For the sake of illustration, details of the process 300 may be described below with reference to FIGS. 1A-2B, which show examples in accordance with some implementations. However, other implementations are also possible.

Block 310 may include receiving a data unit to be stored in persistent storage. Block 320 may include determining a minimum entropy value (MIN) for the received data unit. Block 330 may include determining a maximum entropy value (MAX) for the received data unit. After block 330, the process 300 may continue at decision block 340 (described below). For example, referring to FIG. 1A, the storage controller 110 receives an inbound data stream, and divides the data stream into separate data units. The filter logic 130 performs modified calculations to determine maximum and minimum entropy values. In some implementations, these modified calculations are performed using the look-up table 135. An example process for calculating the maximum and minimum entropy values is discussed below with reference to FIG. 4A.

Decision block 340 may include determining whether the minimum entropy value (MIN) is smaller than a first lower threshold (LT1), and the maximum entropy value (MAX) is smaller than a first upper threshold (UT1). Upon a positive determination ("YES") at decision block 340, the process 300 may continue at block 380, including attempting data reduction of the data unit. For example, referring to FIG. 1A, the storage controller 110 determines that the minimum entropy value (MIN) is smaller than the first lower threshold (e.g., LT1 equal to 4.0, as shown in FIG. 2B), and also determines that the maximum entropy value (MAX) is smaller than the first upper threshold (e.g., UT1 equal to 6.0, as shown in FIG. 2B). In response to these determinations, the storage controller 110 performs one or more data reduction operations for the data unit 105 (e.g., using the deduplication logic 122 and/or the compression logic 126). If the reduction of the data unit 105 is successful, the data unit 105 is stored in the persistent storage 140 as reduced data 150.

However, upon a negative determination ("NO") at decision block 340 (i.e., if the minimum entropy value (MIN) is not smaller than the first lower threshold (LT1), or if the maximum entropy value (MAX) is not smaller than the first upper threshold (UT1)), the process 300 may continue at decision block 350, including determining whether the minimum entropy value (MIN) is smaller than a second lower threshold (LT2), and the maximum entropy value (MAX) is smaller than a second upper threshold (UT2). Upon a positive determination ("YES") at decision block 350, the process 300 may continue at block 360, including determining a Shannon entropy value (SE) for the received data unit. After block 360, the process 300 may continue at decision block 370 (described below). However, upon a negative determination ("NO") at decision block 350 (i.e., if the minimum entropy value (MIN) is not smaller than the second lower threshold (LT2), or if the maximum entropy value (MAX) is not smaller than the second upper threshold (UT2)), the process 300 may continue at block 390 (described below). For example, referring to FIG. 1A, the storage controller 110 determines that the minimum entropy value (MIN) is smaller than the second lower threshold (e.g., LT2 equal to 5.0, as shown in FIG. 2B), and also determines that the maximum entropy value (MAX) is smaller than the second upper threshold (e.g., UT2 equal to 7.5, as shown in FIG. 2B). In response to these determinations, the filter logic 130 performs a modified calculation to determine a Shannon entropy value. In some implementations, this modified calculation is performed using the look-up table 135. An example process for calculating the Shannon entropy value is discussed below with reference to FIG. 4B.

Decision block 370 may include determining whether the Shannon entropy value (SE) is smaller than a third threshold (T3). Upon a positive determination ("YES") at decision block 370, the process 300 may continue at block 380 (described above). However, upon a negative determination ("NO") at decision block 370 (i.e., if the Shannon entropy value (SE) is not smaller than a third threshold (T3)), the process 300 may continue at block 390, including storing the data unit without performing any data reduction. After either block 380 or block 390, the process 300 may be completed. In some examples, the process 300 may be repeated for multiple data units 105 received by the storage system 100. For example, referring to FIG. 1A, if the storage controller 110 determines that the Shannon entropy value (SE) is smaller than the third threshold (e.g., T3 equal to 5.5, as shown in FIG. 2B), the storage controller 110 performs one or more data reduction operations for the data unit 105 (e.g., using the deduplication logic 122 and/or the compression logic 126). If the reduction of the data unit 105 is successful, the data unit 105 is stored in the persistent storage 140 as reduced data 150. Otherwise, if the Shannon entropy value (SE) is not smaller than the third threshold, the storage controller 110 does not reduce the data unit 105, and instead stores the data unit 105 in the persistent storage 140 as unreduced data 160. Further, if the reduction of the data unit 105 is not successful, the storage controller 110 stores the data unit 105 in the persistent storage 140 as unreduced data 160.

Figure 4A:
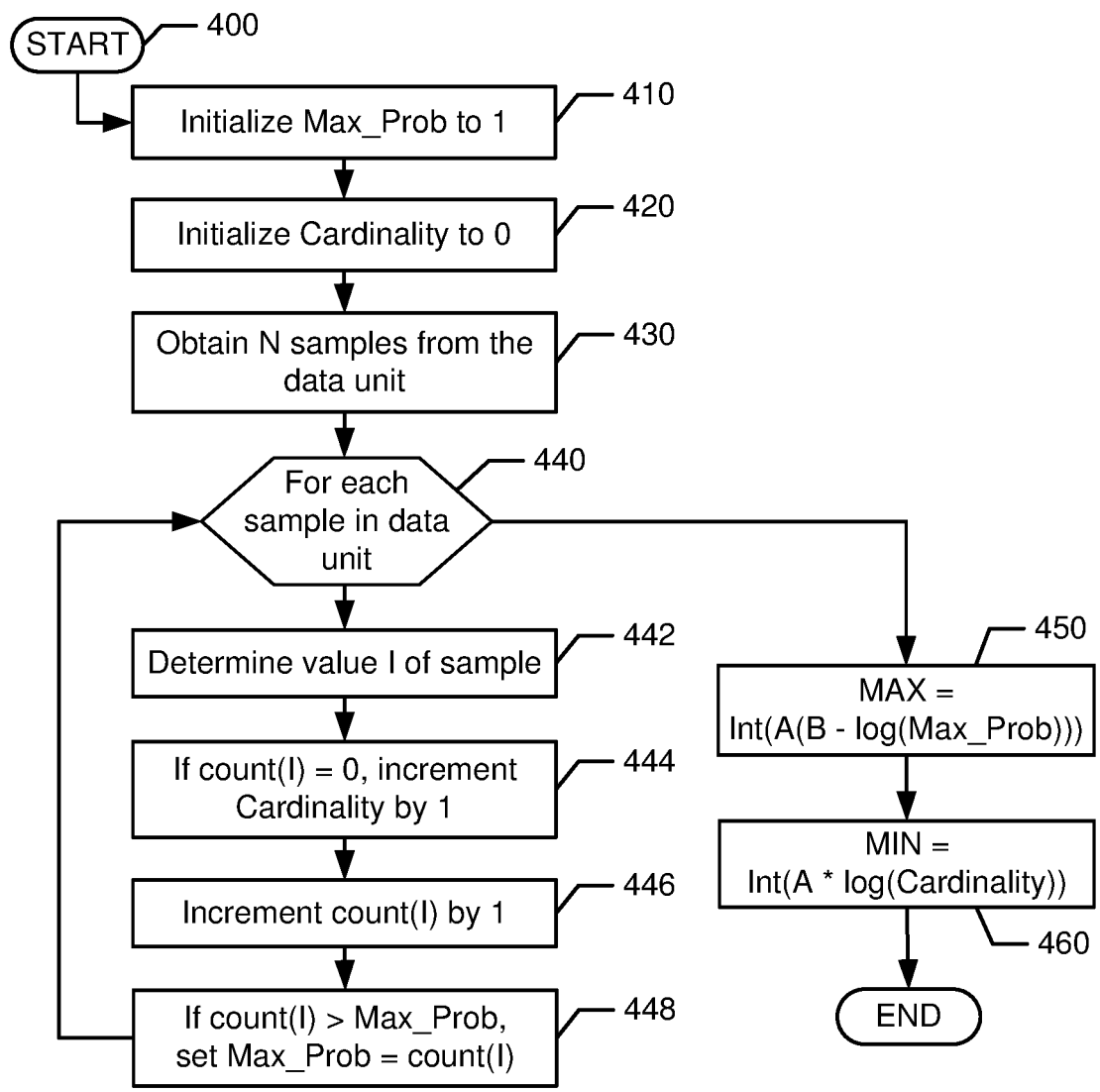
FIGS. 4A-4B are illustrations of example processes, in accordance with some implementations.
Figure 4B:
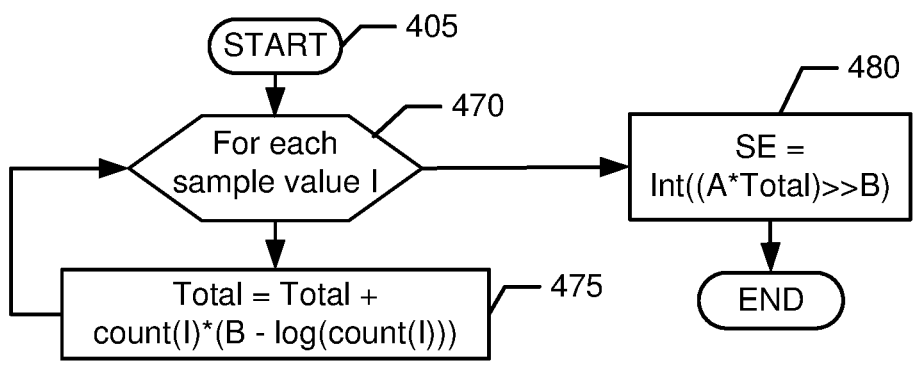

FIGS. 4A-4B—Example Processes for Calculating Entropy Values

FIG. 4A shows an example process 400 for calculating the maximum and minimum entropy values. Further, FIG. 4B shows an example process 405 for calculating a Shannon entropy value. In some examples, the processes 400, 405 may be performed using the storage controller 110 (shown in FIG. 1A). The processes 400, 405 may be implemented in hardware or a combination of hardware and programming (e.g., machine-readable instructions executable by a processor(s)). The machine-readable instructions may be stored in a non-transitory computer readable medium, such as an optical, semiconductor, or magnetic storage device. The machine-readable instructions may be executed by a single processor, multiple processors, a single processing engine, multiple processing engines, and so forth. For the sake of illustration, details of processes 400, 405 may be described below with reference to FIGS. 1A-2B, which show examples in accordance with some implementations. However, other implementations are also possible.

Referring now to FIG. 4A, block 410 may include initializing a maximum probability variable ("Max_Prob") to a value of 1. Block 420 may include initializing a cardinality variable ("Cardinality") to a value of 0. Block 430 may include obtaining N samples from the data unit. For example, referring to FIG. 1A, the storage controller 110 may generate samples of 8 randomly chosen bytes, with each sample being taken from each of 32 uniformly distributed blocks within a 16384-byte data unit (e.g., a cache memory page).

At block 440, a loop (defined by blocks 440-448) may be entered to process each sample in the data unit (obtained at block 430). Block 442 may include determining the value I of the current sample. Block 444 may include determining a count of the sample value I ("count (I)") (i.e., the number of instances that the value I has occurred so far in the samples of the data unit). If the count of the sample value I is currently equal to 0, the cardinality variable may be incremented by 1. In some implementations, the count of the sample value I ("count (I)") may be determined using a histogram function.

Block 444 may include incrementing the count of sample value I by 1. Block 448 may include, if the count of the sample value I is greater than the current maximum probability variable, setting the maximum probability variable equal to the current count of sample value I. After block 448, the loop may return to block 440 (i.e., to process another sample in the data unit). After all of the samples have been processed at block 440, the process 400 may continue at block 450.

Block 450 may include setting the maximum entropy value ("MAX") equal to the value of the formula Int(A(B−log$_2$(Max_Prob))) (i.e., the integer cast of the product of constant A times the difference between constant B minus the binary logarithm of the maximum probability variable). For example, in some implementations, the variable A may be equal to 10, and the variable B may be equal to 8. Further, in some implementations, the binary logarithm of the maximum probability variable may be determined by performing a look-up of the maximum probability variable in the look-up table 135.

Block 450 may include setting the minimum entropy value ("MIN") equal to the value of the formula Int(A*log$_2$(MaxCardinality)) (i.e., the integer cast of the product of constant A times the binary logarithm of the cardinality variable). In some implementations, the binary logarithm of the cardinality variable may be determined by performing a look-up of the cardinality variable in the look-up table 135. After block 460, the process 400 may be completed.

Referring now to FIG. 4B, at block 470, a loop (defined by blocks 470-475) may be entered to process each sample value I (determined at block 442 in FIG. 4A) in the data unit. Block 475 may include setting the value of the total variable ("Total") equal to the previous value of the total variable plus the value of the formula count(I)*(B−log(count(I))) (i.e., the product of the count of the sample value I times the difference between the variable B minus the binary logarithm of the count of the sample value I). In some implementations, the binary logarithm of the count of the sample value I may be determined by performing a look-up of the count of the sample value I in the look-up table 135.

After all of the sample values I have been processed at block 470, the process 405 may continue at block 480. Block 480 may include setting the Shannon entropy value (SE) equal to the value of the formula Int((A*Total)>>B) (i.e., the integer cast of the product of constant A times the total variable, where the product is bitwise right-shifted by B bits). After block 480, the process 405 may be completed.

Figure 5:
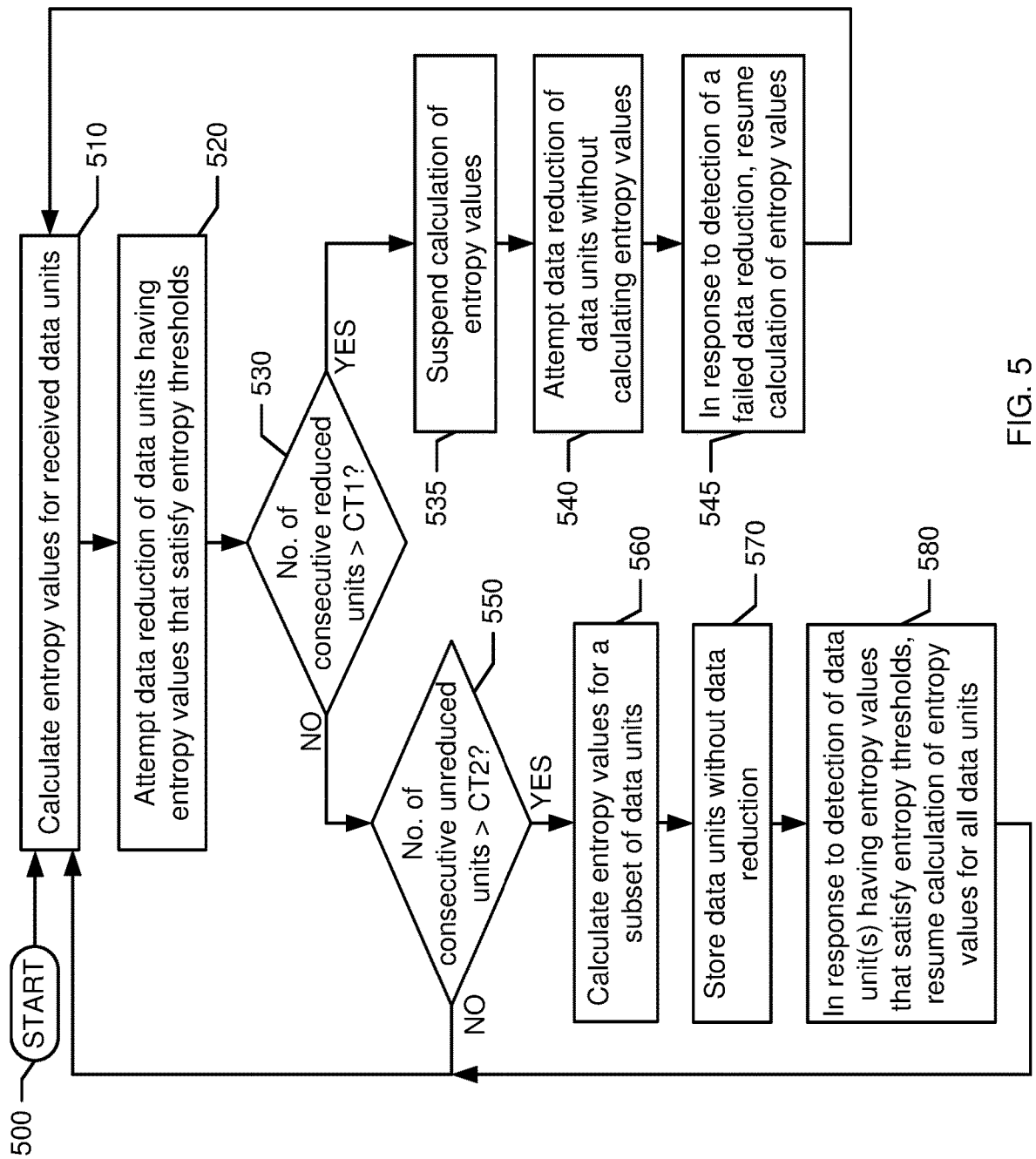
FIG. 5 is an illustration of an example process, in accordance with some implementations.

FIG. 5—Example Process for Storing Data

FIG. 5 shows an example process 500 for storing data, in accordance with some implementations. In some examples, the process 500 may be performed using the storage controller 110 (shown in FIG. 1A). The process 500 may be implemented in hardware or a combination of hardware and programming (e.g., machine-readable instructions executable by a processor(s)). The machine-readable instructions may be stored in a non-transitory computer readable medium, such as an optical, semiconductor, or magnetic storage device. The machine-readable instructions may be executed by a single processor, multiple processors, a single processing engine, multiple processing engines, and so forth. For the sake of illustration, details of the process 500 may be described below with reference to FIGS. 1A-2B, which show examples in accordance with some implementations. However, other implementations are also possible.

Block 510 may include calculating entropy values for received data units. Block 510 may include attempting data reduction of data units having entropy values that satisfy entropy thresholds. For example, referring to FIG. 1A, the storage controller 110 receives an inbound data stream, and divides the data stream into separate data units 105. The storage controller 110 performs modified calculations to determine entropy values for a data unit 105, and compares the entropy values against corresponding thresholds 137 to determine whether the data unit 105 is viable for reduction. If it is determined that a data unit 105 is viable for reduction, the storage controller 110 attempt to reduce that data unit 105. If the reduction of the data unit 105 is successful, the data unit 105 is stored in the persistent storage 140 as reduced data 150. Otherwise, if it is determined that a data unit 105 is not viable for reduction, the storage controller 110 does not reduce that data unit 105, and instead stores it in the persistent storage 140 as unreduced data 160. Further, if the reduction of the data unit 105 is not successful, the storage controller 110 stores the data unit 105 in the persistent storage 140 as unreduced data 160.

Decision block 530 may include determining whether the consecutive number of reduced data units is greater than a first consecutive threshold ("CT1"). Upon a negative determination ("NO") at decision block 530, the process 500 may continue at decision block 550 (described below). Otherwise, upon a positive determination ("YES") at decision block 530, the process 500 may continue at block 535, including suspending the calculation of entropy values for subsequent data units. Block 540 may include attempting data reduction of the subsequent data units without calculating their entropy values. Block 545 may include, in response to a detection of a failed data reduction, resuming calculation of entropy values for the subsequent data units. After block 545, the process 500 may return to block 510. For example, referring to FIG. 1A, the storage controller 110 determines that the consecutive number of reduced data units (i.e., the number of consecutive data units that are reduced based on their entropy values) is greater than the CT1 threshold. In response, the storage controller 110 begins attempting to reduce each subsequent data unit 105 without calculating its entropy values. Upon detecting a failed data reduction of at least one data unit 105 (i.e., a data reduction that fails to reduce the size of a data unit 105 by at least a specified ratio), the storage controller 110 resumes calculating entropy values for subsequent data units 105, and using the entropy values to determine whether to perform reduction operations for those data units 105.

Decision block 550 may include determining whether the consecutive number of unreduced data units is greater than a second consecutive threshold ("CT2"). Upon a negative determination ("NO") at decision block 550, the process 500 may return to block 510 (i.e., to continue calculating entropy values for received data units). Otherwise, upon a positive determination ("YES") at decision block 550, the process 500 may continue at block 560, including calculating entropy values for a subset of the data units. Block 570 may include storing data units without attempting data reduction. Block 580 may include, in response to a detection of data unit(s) having entropy values that satisfy entropy thresholds, resuming the calculation of entropy values for all data units. After block 580, the process 500 may return to block 510. For example, referring to FIG. 1A, the storage controller 110 determines that the consecutive number of unreduced data units (i.e., the number of consecutive data units that are not reduced based on their entropy values) is greater than the CT2 threshold. In response, the storage controller 110 begins storing each subsequent data unit 105 without attempting reduction of those data units 105. Further, the storage controller 110 calculates entropy values for a subset of the data units 105 (e.g., one out of every fifty data units), and compares the entropy values against the thresholds 137 to determine whether any data unit 105 of the subset is viable for reduction. If at least a specified number (e.g., 1, 5, etc.) of data units 105 are determined to be viable, the storage controller 110 resumes calculating entropy values for subsequent data units 105, and using the entropy values to determine whether to perform reduction operations for those subsequent data units 105.

In some implementations, the process 500 may provide a feedback mechanism for determining whether to attempt data reduction based on information about the recent numbers of reduced or unreduced data units. Accordingly, the use of data reduction may be automatically increased during conditions in which data reduction is more effective. Further, the use of data reduction may be automatically decreased during conditions in which data reduction is less effective. In this manner, the process 500 may improve the performance of the storage system.

Figure 6:
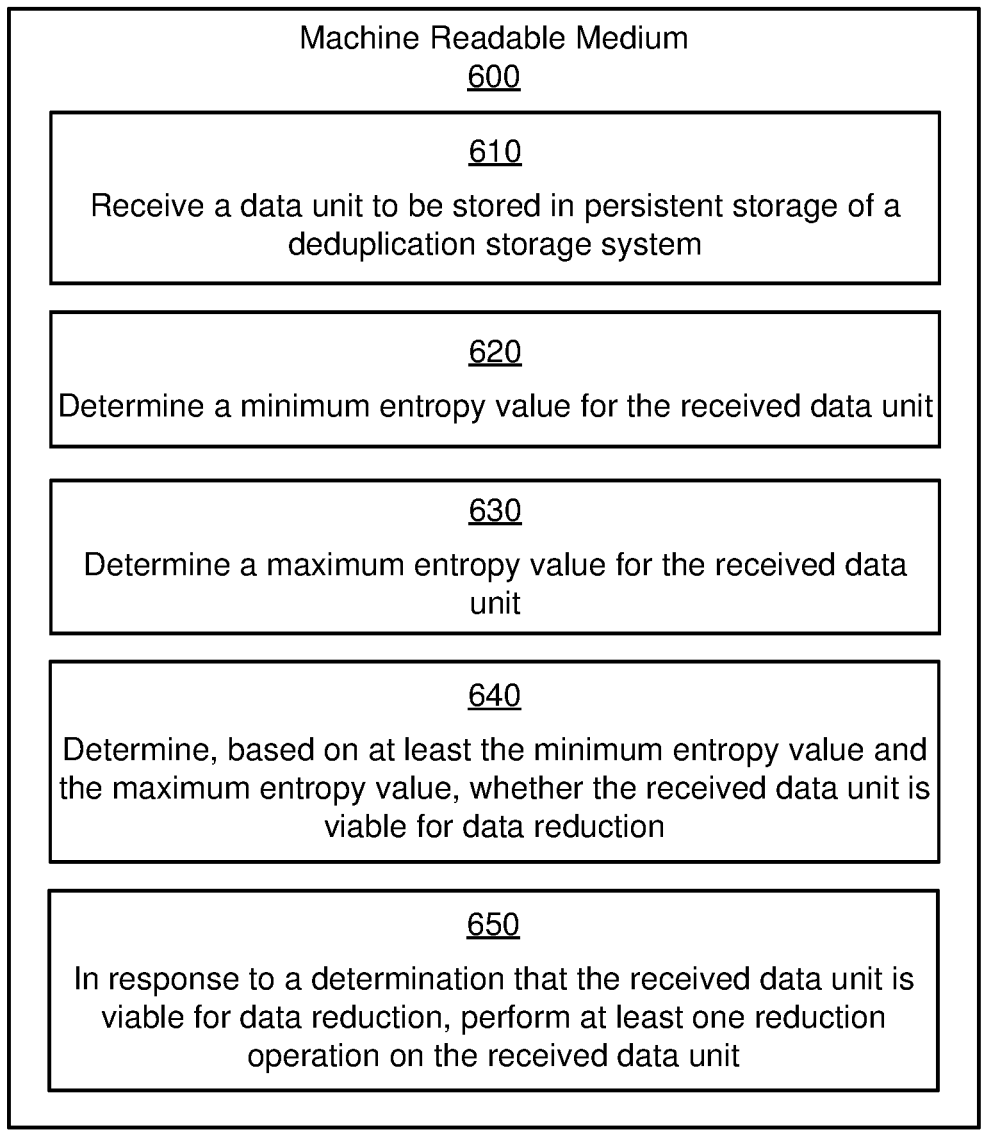
FIG. 6 is a diagram of an example machine-readable medium storing instructions in accordance with some implementations.

FIG. 6—Example Machine-Readable Medium

FIG. 6 shows a machine-readable medium 600 storing instructions 610-650, in accordance with some implementations. The instructions 610-650 can be executed by a single processor, multiple processors, a single processing engine, multiple processing engines, and so forth. The machine-readable medium 600 may be a non-transitory storage medium, such as an optical, semiconductor, or magnetic storage medium.

Instruction 610 may be executed to receive a data unit to be stored in persistent storage of a deduplication storage system. Instruction 620 may be executed to determine a minimum entropy value for the received data unit. Instruction 630 may be executed to determine a maximum entropy value for the received data unit. For example, referring to FIG. 1A, the storage controller 110 receives an inbound data stream, and divides the data stream into separate data units 105. The storage controller 110 performs the process 400 (shown in FIG. 4A) to calculate the maximum entropy value ("MAX") and the minimum entropy value ("MIN").

Instruction 640 may be executed to determine, based on at least the minimum entropy value and the maximum entropy value, whether the received data unit is viable for data reduction. Instruction 650 may be executed to, in response to a determination that the received data unit is viable for data reduction, perform at least one reduction operation on the received data unit. For example, referring to FIGS. 1A, the storage controller 110 performs at least a portion of the process 300 (shown in FIG. 3) to compare the maximum and minimum entropy values to the corresponding thresholds (e.g., LT1, UT1, LT2, UT2), and thereby determines that data unit is viable for data reduction. In response to this determination, the storage controller 110 performs at least one reduction operation (e.g., deduplication, compression) to attempt to reduce the received data unit. In some examples, if the comparison of the maximum and minimum entropy values to the corresponding thresholds is not sufficient to determine whether the data unit is viable, the storage controller 110 may also determine a Shannon entropy value for the data unit, and determine whether the data unit is viable for reduction based on a comparison of the Shannon entropy value to a corresponding threshold (e.g., as illustrated by boxes 360 and 370 shown in FIG. 3).

Figure 7:
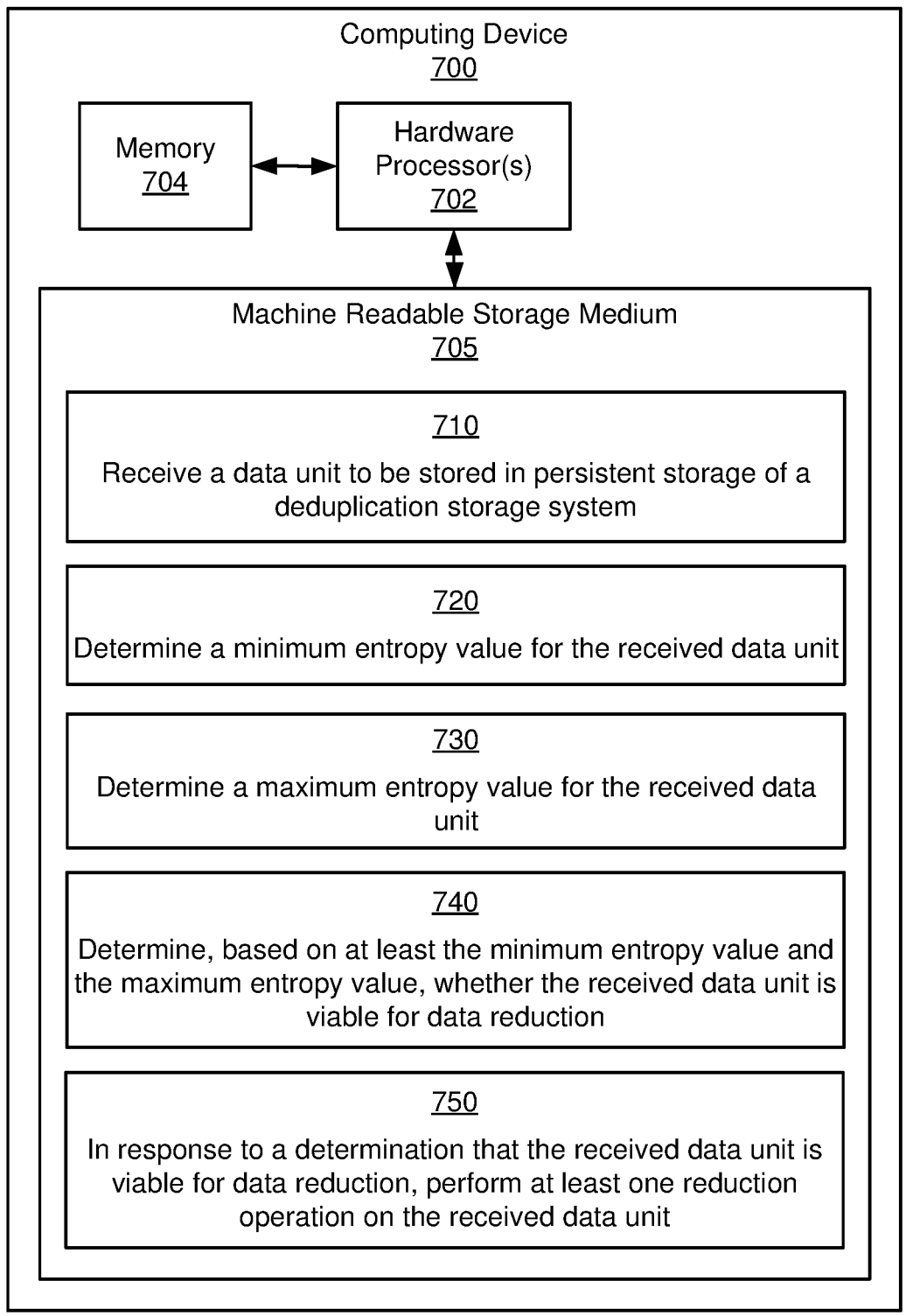
FIG. 7 is a schematic diagram of an example computing device, in accordance with some implementations.

FIG. 7—Example Computing Device

FIG. 7 shows a schematic diagram of an example computing device 700. In some examples, the computing device 700 may correspond generally to some or all of the storage system 100 (shown in FIG. 1A). As shown, the computing device 700 may include hardware processor 702 and machine-readable storage 705 including instruction 710-750. The machine-readable storage 705 may be a non-transitory medium. The instructions 710-750 may be executed by the hardware processor 702, or by a processing engine included in hardware processor 702.

Instruction 710 may be executed to receive a data unit to be stored in persistent storage of a deduplication storage system. Instruction 720 may be executed to determine a minimum entropy value for the received data unit. Instruction 730 may be executed to determine a maximum entropy value for the received data unit. Instruction 740 may be executed to determine, based on at least the minimum entropy value and the maximum entropy value, whether the received data unit is viable for data reduction. Instruction 750 may be executed to, in response to a determination that the received data unit is viable for data reduction, perform at least one reduction operation on the received data unit.

Figure 8:
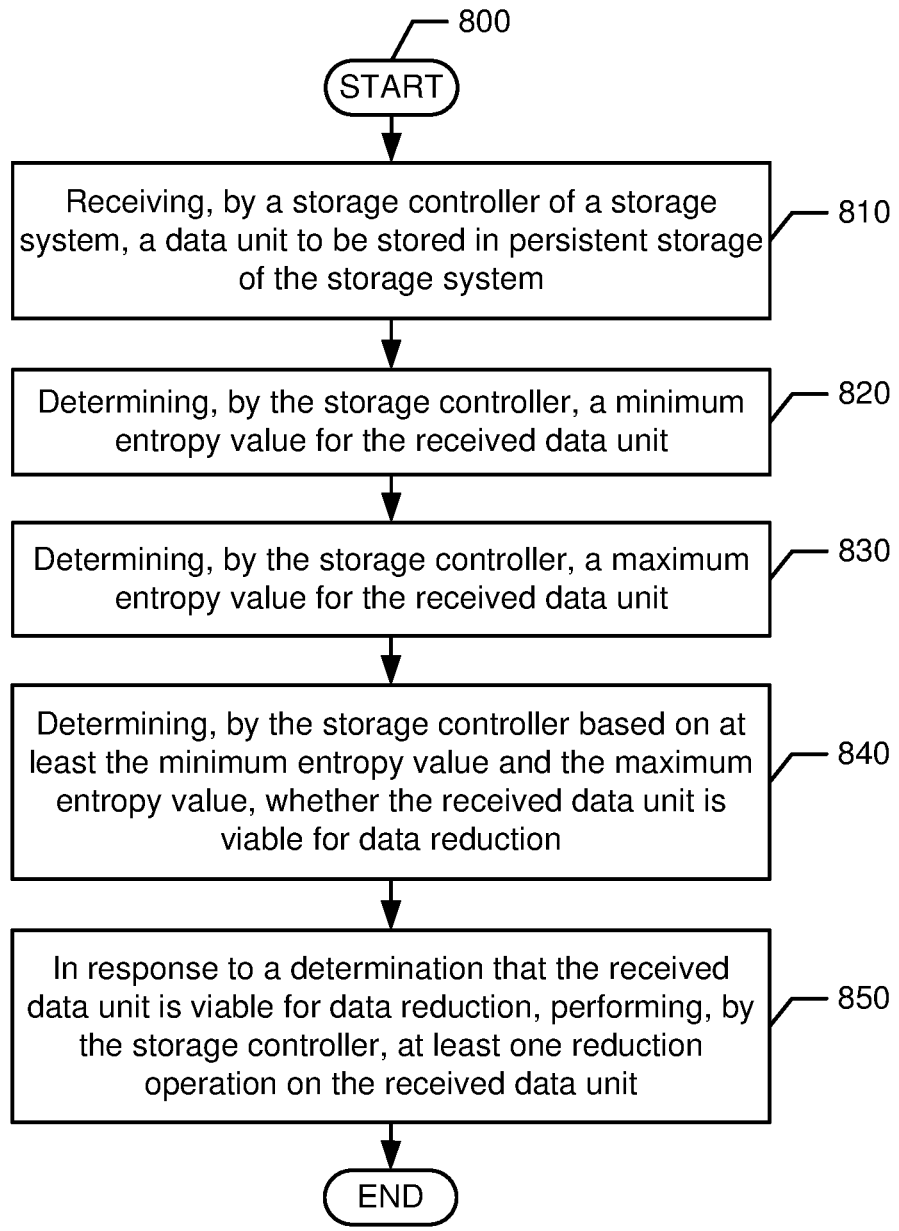
FIG. 8 is an illustration of an example process, in accordance with some implementations.

FIG. 8—Example Process for Storing Data

FIG. 8 shows an example process 800 for storing data, in accordance with some implementations. In some examples, the process 800 may be performed using the storage controller 110 (shown in FIG. 1A). The process 800 may be implemented in hardware or a combination of hardware and programming (e.g., machine-readable instructions executable by a processor(s)). The machine-readable instructions may be stored in a non-transitory computer readable medium, such as an optical, semiconductor, or magnetic storage device. The machine-readable instructions may be executed by a single processor, multiple processors, a single processing engine, multiple processing engines, and so forth. For the sake of illustration, details of the process 800 may be described below with reference to FIGS. 1A-2B, which show examples in accordance with some implementations. However, other implementations are also possible.

Block 810 may include receiving, by a storage controller of a storage system, a data unit to be stored in persistent storage of the storage system. Block 820 may include determining, by the storage controller, a minimum entropy value for the received data unit. Block 830 may include determining, by the storage controller, a maximum entropy value for the received data unit. Block 840 may include determining, by the storage controller based on at least the minimum entropy value and the maximum entropy value, whether the received data unit is viable for data reduction. Block 850 may include, in response to a determination that the received data unit is viable for data reduction, performing, by the storage controller, at least one reduction operation on the received data unit.

In accordance with some implementations described herein, a storage system may include a storage controller to determine whether to attempt data reduction for particular data units. In some implementations, the storage controller may analyze an incoming data unit to determine one or more entropy values for that data unit, and may determine that the data unit is viable for reduction if the entropy values satisfy corresponding thresholds. If it is determined that the data unit is viable for reduction, the storage controller may attempt a reduction of that data unit. In this manner, the storage controller may avoid attempting to reduce data units that are not viable for data reduction. Accordingly, the storage controller may save processing time and/or energy that would otherwise be wasted in unproductive reduction attempts, and may thereby improve the performance and efficiency of the storage system.

Note that, while FIGS. 1A-8 show various examples, implementations are not limited in this regard. For example, referring to FIG. 1A, it is contemplated that the storage system 100 may include additional devices and/or components, fewer components, different components, different arrangements, and so forth. In another example, it is contemplated that the functionality of the storage controller 110 described above may be included in any another engine or software of storage system 100. Other combinations and/or variations are also possible.

Data and instructions are stored in respective storage devices, which are implemented as one or multiple computer-readable or machine-readable storage media. The storage media include different forms of non-transitory memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; optical media such as compact disks (CDs) or digital video disks (DVDs); or other types of storage devices.

Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In the foregoing description, numerous details are set forth to provide an understanding of the subject disclosed herein. However, implementations may be practiced without some of these details. Other implementations may include modifications and variations from the details discussed above. It is intended that the appended claims cover such modifications and variations.

What is claimed is:

1. A storage system comprising:
   a processor; and
   a machine-readable storage storing instructions, the instructions executable by the processor to:
      receive a data unit to be stored in a persistent storage of the storage system;
      determine a first entropy value for the received data unit;
      determine a second entropy value for the received data unit;
      compare the first entropy value to a first lower threshold;
      compare the second entropy value to a first upper threshold; and
      in response to at least one of a determination that the first entropy value is not smaller than the first lower threshold, and a determination that the second entropy value is not smaller than the first upper threshold:
         compare the first entropy value to a second lower threshold;
         compare the second entropy value to a second upper threshold; and
         in response to at least one of a determination that the first entropy value is not smaller than the second lower threshold, and a determination that the second entropy value is not smaller than the second upper threshold, store the data unit in the persistent storage without attempting to reduce the data unit.

2. The storage system of claim 1, including instructions executable by the processor to:
   in response to a determination that the first entropy value is smaller than the first lower threshold, and the second entropy value is smaller than the first upper threshold, perform at least one reduction operation on the received data unit.

3. The storage system of claim 1, including instructions executable by the processor to:

in response to a determination that the first entropy value is smaller than the second lower threshold, and the second entropy value is smaller than the second upper threshold:
    determine a Shannon entropy value for the received data unit;
    compare the Shannon entropy value to a third threshold; and
    in response to a determination that the Shannon entropy value is smaller than the third threshold, perform at least one reduction operation on the received data unit; and
in response to a determination that the Shannon entropy value is not smaller than the third threshold, store the data unit in the persistent storage without attempting to reduce the data unit.

4. The storage system of claim 1, including instructions executable by the processor to:
    calculate the first entropy value and the second entropy value using a look-up table, wherein the look-up table stores a plurality of constants associated with a plurality of index values, and wherein each constant represents a binary logarithm of a different index value.

5. The storage system of claim 1, wherein the at least one reduction operation is selected from a data deduplication operation and a data compression operation.

6. The storage system of claim 1, including instructions executable by the processor to:
    calculate entropy values for a plurality of received data units;
    determine whether a consecutive number of reduced data units is greater than a first consecutive threshold;
    in response to a determination that the consecutive number of reduced data units is greater than the first consecutive threshold:
        suspend a calculation of entropy values for subsequent data units;
        attempt data reduction of the subsequent data units without the calculation of entropy values; and
        in response to a detection of a failed reduction of at least one data unit, resume the calculation of the entropy values.

7. A non-transitory machine-readable medium storing instructions that upon execution cause a processor to:
    receive a data unit to be stored in a persistent storage of a storage system;
    determine a Rényi entropy value for the received data unit using a first technique;
    determine a Hartley entropy value for the received data unit using a second technique different than the first technique;
    determine, based on at least the Rényi entropy value for the received data unit and the Hartley entropy value for the received data unit, whether the received data unit is viable for data reduction; and
    in response to a determination that the received data unit is viable for data reduction, perform at least one reduction operation on the received data unit.

8. The non-transitory machine-readable medium of claim 7, including instructions that upon execution cause the processor to:
    compare the Rényi entropy value to a first lower threshold;
    compare the Hartley entropy value to a first upper threshold; and
    in response to a determination that the Rényi entropy value is smaller than the first lower threshold, and the Hartley entropy value is smaller than the first upper threshold, perform the at least one reduction operation on the received data unit.

9. The non-transitory machine-readable medium of claim 8, including instructions that upon execution cause the processor to:
    in response to at least one of a determination that the Rényi entropy value is not smaller than the first lower threshold, and a determination that the Hartley entropy value is not smaller than the first upper threshold:
        compare the Rényi entropy value to a second lower threshold;
        compare the Hartley entropy value to a second upper threshold; and
        in response to at least one of a determination that the Rényi entropy value is not smaller than the second lower threshold, and a determination that the Hartley entropy value is not smaller than the second upper threshold, store the data unit in the persistent storage without attempting to reduce the data unit.

10. The non-transitory machine-readable medium of claim 9, including instructions that upon execution cause the processor to:
    in response to a determination that the Rényi entropy value is smaller than the second lower threshold, and the Hartley entropy value is smaller than the second upper threshold:
        determine a Shannon entropy value for the received data unit;
        compare the Shannon entropy value to a third threshold; and
        in response to a determination that the Shannon entropy value is smaller than the third threshold, perform the at least one reduction operation on the received data unit.

11. The non-transitory machine-readable medium of claim 10, including instructions that upon execution cause the processor to:
    in response to a determination that the Shannon entropy value is not smaller than the third threshold, store the data unit in the persistent storage without attempting to reduce the data unit.

12. The non-transitory machine-readable medium of claim 7, including instructions that upon execution cause the processor to:
    calculate the Rényi entropy value and the Hartley entropy value using a look-up table, wherein the look-up table stores a plurality of constants associated with a plurality of index values, and wherein each constant represents a binary logarithm of a different index value.

13. The non-transitory machine-readable medium of claim 7, wherein the at least one reduction operation is selected from a data deduplication operation and a data compression operation.

14. A method comprising:
    receiving, by a storage controller of a storage system, a data unit to be stored in persistent storage of the storage system;
    determining, by the storage controller, a first entropy value for the received data unit using a first technique;
    determining, by the storage controller, a second entropy value for the received data unit using a second technique different than the first technique;
    determining, by the storage controller based on at least the first entropy value for the received data unit and the second entropy value for the received data unit, whether the received data unit is viable for a data compression operation; and in response to a determination that the received data unit is viable for data reduction based on the first and second entropy values, performing, by the storage controller, the data compression operation on the received data unit.

15. The method of claim 14, comprising:

comparing the first entropy value to a first lower threshold;

comparing the second entropy value to a first upper threshold; and in response to a determination that the first entropy value is smaller than the first lower threshold, and the second entropy value is smaller than the first upper threshold, performing the at least one reduction operation on the received data unit.

16. The method of claim 15, comprising:

in response to at least one of a determination that the first entropy value is not smaller than the first lower threshold, and a determination that the second entropy value is not smaller than the first upper threshold:

comparing the first entropy value to a second lower threshold;

comparing the second entropy value to a second upper threshold; and in response to at least one of a determination that the first entropy value is not smaller than the second lower threshold, and a determination that the second entropy value is not smaller than the second upper threshold, storing the data unit in the persistent storage without attempting to reduce the data unit.

17. The method of claim 16, comprising:

in response to a determination that the first entropy value is smaller than the second lower threshold, and the second entropy value is smaller than the second upper threshold:

determining a Shannon entropy value for the received data unit;

comparing the Shannon entropy value to a third threshold; and in response to a determination that the Shannon entropy value is smaller than the third threshold, performing the data compression operation on the received data unit.

18. The method of claim 14, comprising:

calculating the minimum entropy value and the maximum entropy value using a look-up table, wherein the look-up table stores a plurality of constants associated with a plurality of index values, and wherein each constant represents a binary logarithm of a different index value.

19. The method of claim 14, wherein:

the first entropy value is a minimum entropy value; and
the second entropy value is a maximum entropy value.

20. The method of claim 19, wherein:

the first entropy value is a Rényi entropy value; and
the second entropy value is a Hartley entropy value.

* * * * *